United States Patent
Carmel et al.

(10) Patent No.: US 8,514,761 B2
(45) Date of Patent: Aug. 20, 2013

(54) METHOD AND APPARATUS FOR SAVING POWER IN ATSC-M/H MOBILE DEVICES

(75) Inventors: Yuval Carmel, Haifa (IL); Alecsander P. Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 12/887,380

(22) Filed: Sep. 21, 2010

(65) Prior Publication Data

US 2012/0069196 A1   Mar. 22, 2012

(51) Int. Cl.
G08C 17/00   (2006.01)
(52) U.S. Cl.
USPC ........... 370/311; 370/313; 370/498; 348/460; 348/469; 375/240.01; 714/699; 714/758
(58) Field of Classification Search
None
See application file for complete search history.

(56) References Cited

U.S. PATENT DOCUMENTS

| | | | | |
|---|---|---|---|---|
| 8,311,096 | B2 * | 11/2012 | Rusch-Ihwe | 375/240.02 |
| 2008/0057913 | A1 * | 3/2008 | Sinha et al. | 455/414.1 |
| 2008/0201625 | A1 * | 8/2008 | Mulligan | 714/758 |
| 2010/0050056 | A1 | 2/2010 | Kim et al. | |
| 2010/0238916 | A1 * | 9/2010 | Zurek-Terhardt et al. | 370/349 |

FOREIGN PATENT DOCUMENTS

| | | |
|---|---|---|
| WO | WO2005109625 A2 | 11/2005 |
| WO | WO2007000627 A1 | 1/2007 |

OTHER PUBLICATIONS

Bretl, Wayne; "Physical Layer for ATSC Mobile DTV"; Feb. 3, 2010; pp. 22-42.*
International Search Report and Written Opinion—PCT/US2011/050260—ISA/EPO—Nov. 11, 2011 (101120WO).

* cited by examiner

*Primary Examiner* — Andrew Chriss
*Assistant Examiner* — Salvador E Rivas
(74) *Attorney, Agent, or Firm* — Fulbright & Jaworski LLP

(57) ABSTRACT

Methods and apparatus enable ATSC-M/H mobile devices to conserve power by entering a high power state at a slot reception start time that is after the start of an ATSC M/H slot and entering a low power state at a slot reception stop time before the end of the ATSC M/H slot. Data lost due to the device being in a low power state during the time between the start time of the ATSC M/H slot and the activation time and during the time between the deactivation time and the end of the ATSC M/H slot are recovered using error correction processing. The slot receive and slot reception stop times may be based on the received signal quality. The receiver circuitry may also be deactivated when the entire payload has been received and skip reception of remaining slots.

48 Claims, 11 Drawing Sheets

US 8,514,761 B2

METHOD AND APPARATUS FOR SAVING POWER IN ATSC-M/H MOBILE DEVICES

BACKGROUND

Wireless communication technologies have seen explosive growth over the past few years. This growth has been fueled by wireless services providing freedom of movement to the mobile public, and cutting the tether to hardwired communication systems. One of the wireless services that have evolved recently is the broadcast of digital television for reception by mobile and hand held devices. One format for broadcasting digital television signals is defined by the Advanced Television Systems Committee for digital television transmission in a standard typically referred to as "ATSC". The ATSC broadcast format is used for broadcasting digital television signals to fixed television receivers (e.g., home television sets). More recently, the Advanced Television Systems Committee has defined a new standard for broadcasting digital television that is suitable for reception by mobile and handheld television receivers, which is referred to as the "ATSC-M/H" standard.

SUMMARY

The various embodiments provide methods and devices that enable mobile receiver devices capable of receiving ATSC-M/H transmissions to reduce power consumption, thus extending battery life, by leveraging error correction capabilities supported in the transmitted signal. Due to the manner in which information is encoded, multiplexed and interleaved within the ATSC-M/H broadcast signal, a portion of start and end of a transmission slot may be missed (i.e., not received) without jeopardizing the ability of the receiver device to recover all of the information within the transmission slot using error correction processing. The various embodiments take advantage of this by delaying the time that the receiver enters a high power consumption state to receive a slot transmission (e.g., by activating the receiver circuitry) to a time after the start of each transmission slot, and entering a low power consumption state (e.g., by deactivating the receiver circuitry) before the conclusion of the slot transmission. Data lost by not receiving part of the slot transmissions may then be recovered using error correction algorithms and circuitry. In a further embodiment, a receiver device may determine whether an end of a payload in the ATSC-M/H parade transmission has been reached, and if so, determining whether a received payload includes errors after reception, and enter the low power consumption state to conserve power when the end of the payload is reached if there are no errors. In this manner, the receiver device may remain in a low power consumption state, such as with receiver circuitry deactivated, a larger percentage of the time than described in the ATSC-M/H standard. As a result, significant savings in power consumption, and thus extension of battery life of ATSC-M/H receiver devices may be achieved with no changes in the ATSC-M/H standard.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
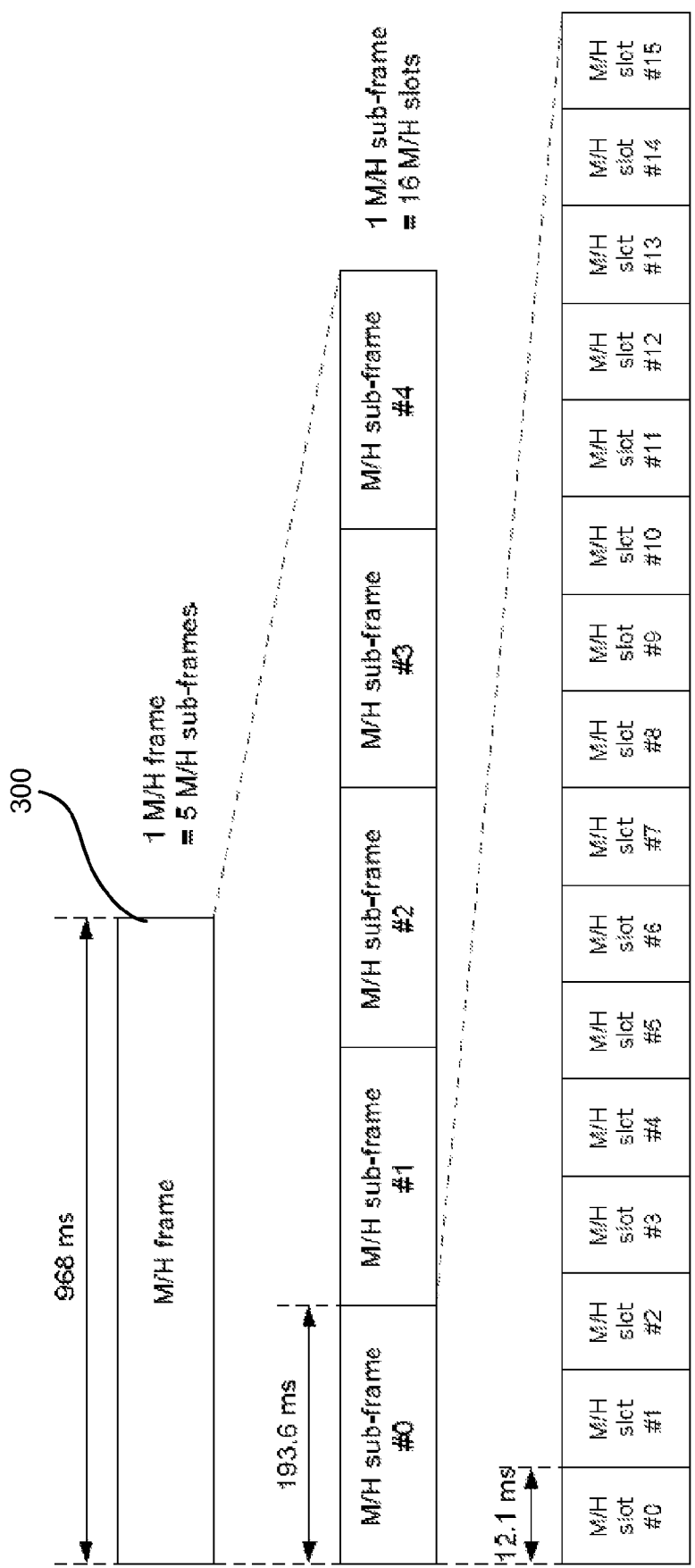
FIG. 1 is a diagram of a broadcast M/H frame structure of an ATSC-M/H broadcast transmission.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "broadcast" is used herein to mean the transmission of data (information packets) so that it can be received by a large number of receiving devices simultaneously.

The terms "mobile device" and "receiver device" used interchangeably herein to refer generally to any digital television receiver configured to receive ATSC-M/H standard wireless broadcasts.

The ATSC standard has been widely adopted for the broadcast of digital television. The high definition television standards defined by the ATSC produce wide screen 16:9 images up to 1920×1080 pixels in size—more than six times the display resolution of the earlier standard. However, many different image sizes are also supported. The ATSC standard encodes information in the radio frequency signal using vestigial sideband modulation (VSB).

Recently, the Advanced Television Systems Committee has developed a new and separate broadcast standard for broadcasting television signals to mobile and handheld receivers known as the "ATSC Mobile/Handheld" or "ATSC-M/H" standard. A new standard was needed for mobile television systems because the movement of mobile devices can lead to interference and changes in the received signal timing that render the ATSC standard unreliable. The ATSC-M/H A/153 standard is based on the ATSC standard with some changes that make ATSC-M/H receivers less susceptible to mobile environment, such as several more training sequences which are longer than those of ATSC and are added in higher frequency than the training sequence in ATSC. These additional training sequences make it easier for mobile devices to obtain and remain synchronized with broadcast transmissions.

The ATSC-M/H standard was developed to ensure backward compatibility with ATSC mobile devices and ATSC broadcast networks. Thus, the ATSC-M/H data (referred to herein as "M/H signals" or "M/H service") is added to the ATSC service, which is also referred to as the "main service." The ATSC and ATSC-M/H services are multiplexed in time to generate a single multiplexed broadcast signal. Thus, the ATSC-M/H transmission shares the same RF channel as the standard ATSC service. The shared broadcast signal is accomplished by allocating a portion of the total available ~19.4 Mbps signal data rate to ATSC-M/H and utilizing delivery over IP transport. However, ATSC receiver devices do not receive the ATSC-M/H service, and ATSC-M/H mobile devices do not receive the ATSC service.

According to the ATSC-M/H standard, each ATSC-M/H transmission system inserts long and regularly spaced training sequences into each ATSC-M/H group. An ATSC-M/H group is a collection of 118 consecutive M/H encapsulation packets (encapsulated transport packets delivering M/H service data) and the corresponding data symbols in the 8-VSB signal after interleaving and trellis coding at the MPEG-2 transport stream level. The length of the training sequences provides fast acquisition of the channel during bursted power-saving operation of the demodulator.

Mobile devices, such as mobile television receivers configured to receive ATSC-M/H format broadcast television signals, are typically battery-operated. As a result, significant development efforts have gone into circuitry and signal processing techniques that enable extending the battery life of mobile devices. One technique used to extend the battery life of mobile devices is to de-energize their receiver circuitry whenever the broadcast signal does not include information of use to the device. For example, as described in more detail below, the ATSC-M/H signals are interspersed between the main service ATSC signals, so ATSC-M/H receiver devices may be configured to deactivate their receiver circuitry during the times that the main service is being broadcast. Such methods and advancements in processor circuitry have enabled mobile television receiver devices to become a commercial reality. However, any improvement in battery life can significantly improve the user's experience by prolonging the receiver operation time.

The various embodiments provide methods and devices that reduce power consumption, thus extending battery life, of ATSC-M/H receiver devices by further reducing the time that the receiver circuitry is energized by utilizing error correction capabilities supported in the transmitted signal. Due to the manner in which information is encoded, multiplexed and interleaved within the ATSC-M/H broadcast signal, a portion of the start and end of a transmission slot may be missed (i.e., not received) without jeopardizing the ability of the receiver device to recover all of the information within the transmission slot using error correction processing. The various embodiments take advantage of this fact by delaying the time that the receiver enters a high power state to receive a slot transmission (e.g., by activating the receiver circuitry) to a time after the start of each transmission slot, and entering a low power state (e.g., by deactivating the receiver circuitry) before the conclusion of the slot transmission. Data that is not received because the receiver does not receive the entire transmission slot may then be recovered using error correction calculations. In this manner, the receiver device may remain in a low power state, such as with receiver circuitry deactivated, larger percentage of the time than provided for in the ATSC-M/H standard. As a result, significant savings in power consumption, and thus extension of battery life of ATSC-M/H receiver devices may be achieved with no changes in the ATSC-M/H standard.

The various embodiments take advantage of data transmission characteristics of ATSC-M/H data transmissions, so an introduction to the ATSC-M/H data structures and terminology is provided below. More information regarding ATSC-M/H is available in the ATSC-M/H A/153 standard which is incorporated herein by reference.

FIG. 1 illustrates the data structure utilized in ATSC-M/H in M/H frame 300, which are referred to as "frames" in the ATSC-M/H specification and as "M/H frame" herein. The M/H frame is a basic time period that carries one or more "M/H parades." M/H parades are explained in more detail below. One M/H frame carries main data and M/H data, which is encapsulated in M/H encapsulation (MHE) packets. The M/H frame consists of five consecutive "M/H sub-frames", respectively numbered "0, 1, 2, 3, and 4". Each M/H sub-frame consists of sixteen consecutive "M/H slots," respectively numbered "0, 1, 2 . . . 15, 16". Each M/H slot consists of 156 transport stream (TS) packets or equivalently 156 data segments (at the symbol level). When packets from a given M/H slot are processed into interleaved data segments, the symbols from that slot are distributed throughout more than 156 data segments. The duration of an M/H slot is approximately 12.1 ms, and the duration of an M/H sub-frame is approximately 193.6 ms. The duration of an M/H frame is approximately 968 ms. The M/H frame organization can be changed M/H frame by M/H frame. This allows adjustment of ensemble data rates on a frequent and flexible basis.

The M/H slot is the basic time period for multiplexing of M/H data and main service data. After M/H pre-processing, M/H data is formatted as a group (i.e., an M/H group) of 118 consecutive M/H encapsulation (MHE) transport packets which encapsulate the M/H service data. A particular slot may contain M/H data, or may consist of only main service data. If an M/H group is transmitted during an M/H slot, then the first 118 transport stream packets in the slot are an M/H group, and the remaining 38 packets are main transport service packets. If there is no M/H group in an M/H slot, the M/H slot consists of 156 main transport stream packets. The number of groups allotted per M/H frame is a multiple of 5, and the group allotment and assignment is identical for all M/H sub-frames in an M/H frame.

An M/H parade is a collection of M/H groups that have the same M/H forward error correction (FEC) parameters. An M/H parade is contained within one M/H frame. Each M/H parade carries one or two "M/H ensembles." Each parade is derived from either one or two Reed-Solomon (RS) frames. The structure of a parade in terms of its constituent group numbers and slot numbers within an M/H sub-frame is replicated in all the M/H sub-frames of an M/H frame (although the data contents of the groups differ among the sub-frames).

The portion of a parade within an M/H sub-frame consists of a collection of consecutively numbered groups. The starting group number for the first parade to which group numbers are assigned is zero. The starting group number of a succeeding parade is the next higher group number after the group numbers for all preceding parades have been assigned. An M/H parade carries data from one or two particular Reed-Solomon frames depending on the Frame Mode. The Reed-Solomon frame is a packet-level FEC structure for the M/H data. Each Reed-Solomon frame carries, and FEC encodes, an M/H ensemble, which is a collection of M/H services providing the same quality of service.

Figure 2:
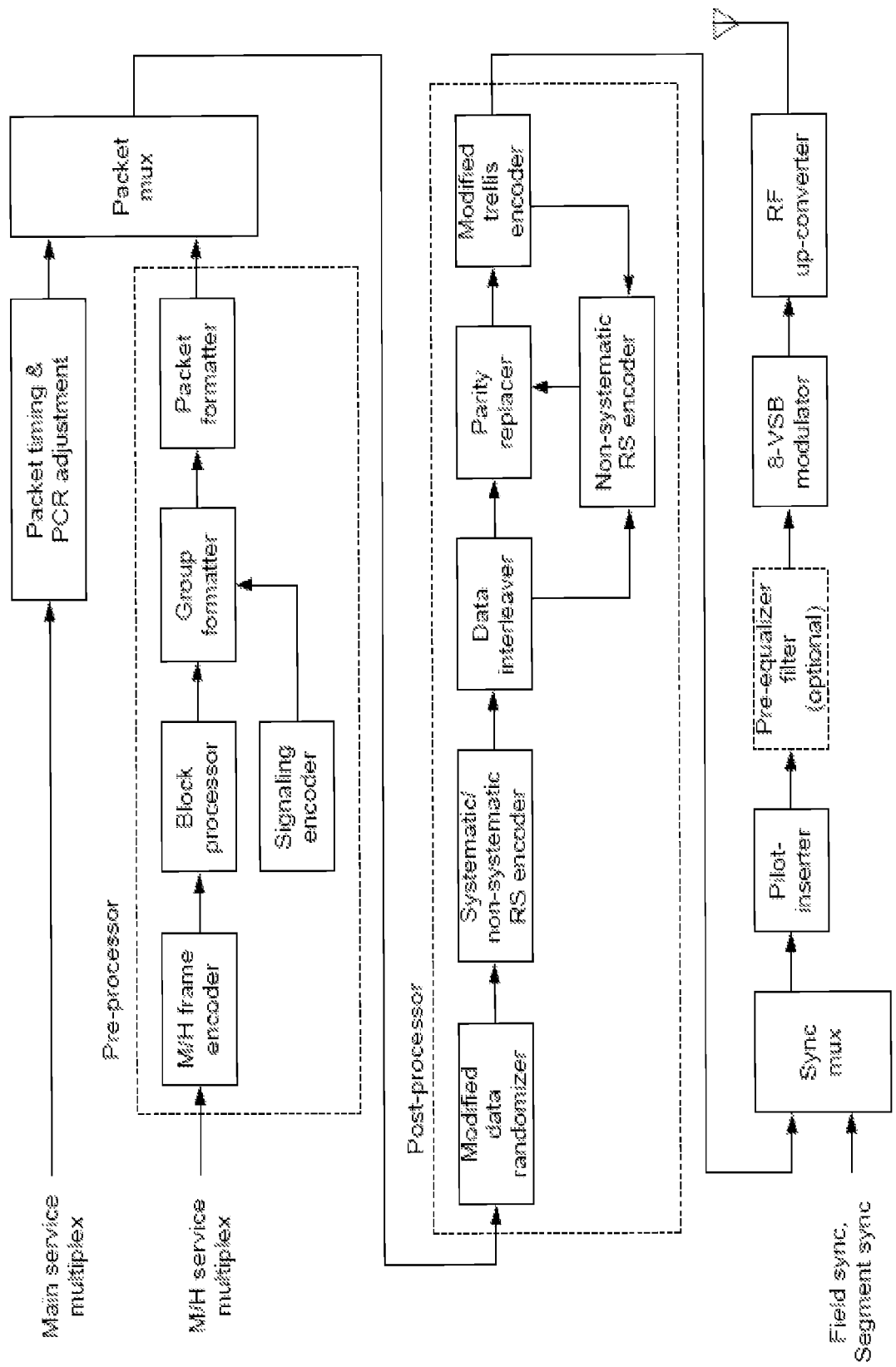
FIG. 2 is a multiplexing process component block diagram of a typical ATSC-M/H broadcast transmitter system.

FIG. 2 is a functional block diagram of an example ATSC-M/H transmission system. The M/H transmission system receives two sets of input streams; one consists of the MPEG transport stream (TS) packets of the main service data, and the other consists of the M/H service data. At a high level, the function of the M/H transmission system is to combine these two types of streams into one stream of MPEG transport stream packets and process and modulate them into the normal ATSC trellis-coded 8-VSB signal.

The M/H frame encoder encodes ensembles into primary and secondary Reed-Solomon (RS) frames, randomizes the M/H data for spectral performance and adds two-dimensional Reed-Solomon and CRC (RS-CRC) encoding. The block processor adds convolutional coding and symbol interleaving to the M/H data to provide added robustness. The signal encoder adds fast information channel (FIC) and transmission parameter channel (TPC) control data, which is coded and interleaved for robustness. The group formatter and the packet formatter arrange the input for the interleaver so that the output is in the desired form. The output of these blocks is processed by the packet multiplexer which multiplexes M/H data and main service data.

The modified data randomizer is of the same legacy as the 8-VSB transmitter, except that it skips over the M/H data which was randomized in the M/H frame encoder. The systematic/non-systematic Reed-Solomon (RS) encoder generates either parity or data bytes when encoding main service or M/H related data, respectively, while maintaining compatibility with legacy 8-VSB receivers. The data interleaver is the same as the legacy 8-VSB transmitter. The modified trellis encoder are initialized before M/H training sequences transmission for having consistent, predefined signals at the M/H receiver, but is otherwise the same as the legacy 8-VSB transmitter. The non-systematic Reed-Solomon encoder and the parity replacer recalculate certain Reed-Solomon parity bytes to replace those calculated prior to the trellis initialization. The primary and secondary RS frames may be transmitted through a parade of groups during an RS frame transmission.

Figure 3:
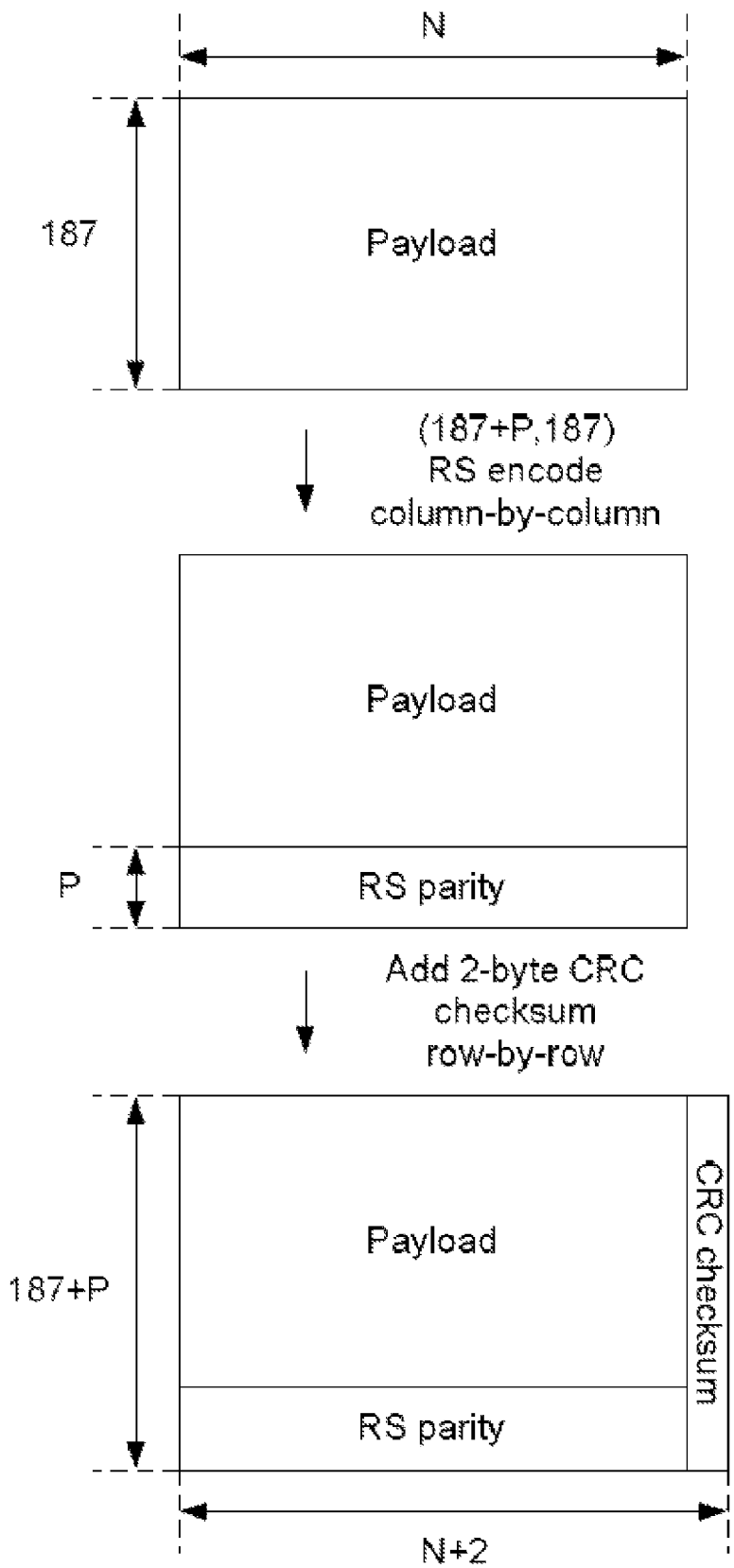
FIG. 3 is a diagram illustrating an RS frame structure of an ATSC-M/H broadcast transmission which is RS-CRC encoded according to an embodiment.

FIG. 3 illustrates a structural diagram of an RS frame according to an embodiment. RS-CRC encoder may perform RS encoding for each of the N-columns of bytes on the RS frame payload and may add the RS parity bytes at the bottom of each column. The RS-CRS encoder may add CRC syndrome bytes at the right end of each row. According to an embodiment, the number of RS payload bytes may be 187. The RS code mode may be set independently for the primary and secondary RS frames.

According to an embodiment, the RS code parity generator polynomial and the primitive field generator polynomial for the RS frame may be:

$$g(x)=(x+a^0)(x+a^1)(x+a^2)\ldots(x+a^{2t-1})\quad\text{Parity generator polynomial:}$$

$$p(x)=x^8+x^4+x^3+x^2+1\quad\text{Primitive field generator polynomial:}$$

For every row of the RS frame encoded by RS, 2 bytes of CRC syndrome check bytes may be added at the right end of each row. The 16-bit (2 byte) CRC data of the CRC code may be generated by the following equation:

$$G_{CRC}=X^{16}+X^{12}+X^5+1$$

In a receiver device, the CRC may be used for error detection and the RS parity may be used for error detection and correction.

Figure 4:
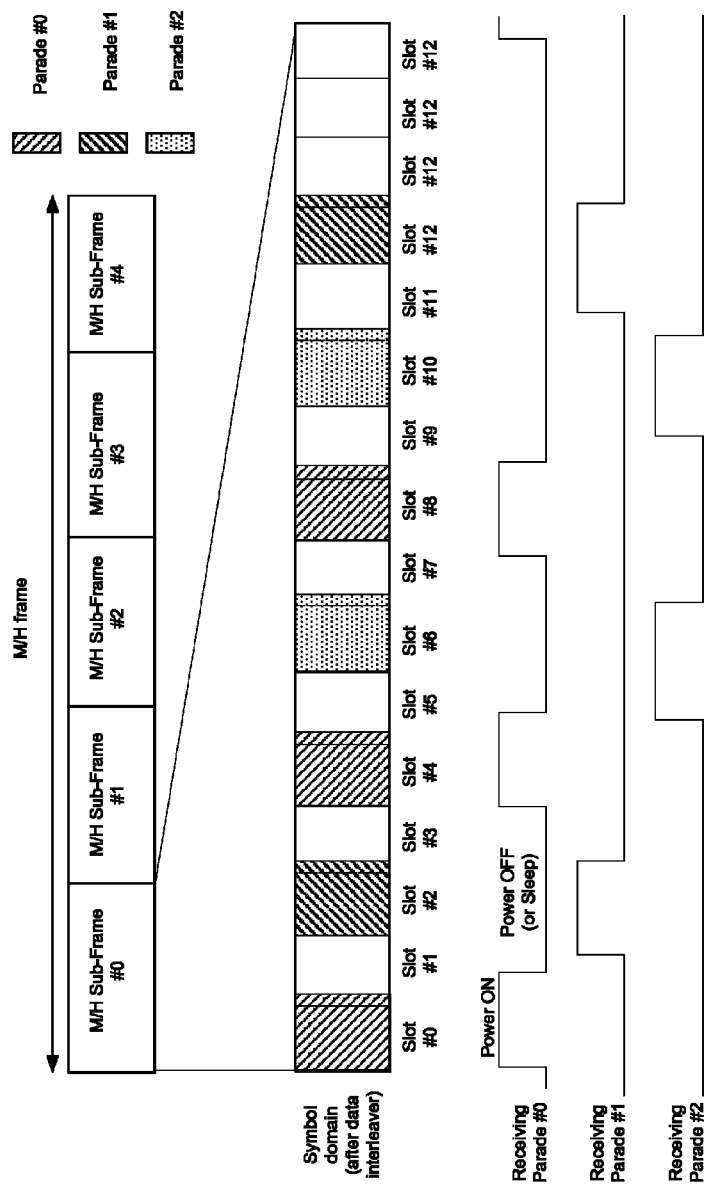
FIG. 4 is a diagram illustrating assignments of multiple broadcast parades to slots in one of the M/H sub-frames within an M/H frame of an ATSC-M/H broadcast transmission.

Multiple M/H parades may be transmitted with the main service data within an M/H frame. FIG. 4 illustrates an M/H frame and its associated M/H sub-frames and slots designates the time for which the mobile device's broadcast receivers should be turned on and receive the M/H data. Here, three M/H parades are shown. Each parade may include a number of groups per M/H sub-frame (NoG) ranging from 1 to 8. Accordingly, the number of groups per M/H frame for a parade ranges from 5 to 40, with a step of 5.

An embodiment mobile device may be configured to enter a high power sufficient to receive the slot transmission, such as by energizing the receiver circuitry, only during the times that data of interest is being transmitted, namely during the transmission of a particular parade, such as parade #0, and enter a low power state (e.g., with receiver circuitry off) during all other times in order to conserve battery power. Accordingly, just after a parade #0 begins transmission the mobile device may enter the high power state, and return to the low power state just before the end of the parade #0 transmission. Each parade #0 may include data about the time of occurrence of the next parade #0. The mobile device may use the data about the time of occurrence of the next parade #0 to determine when for how long to power off before re-energizing the receiver circuit to receive the next parade #0. For example, a first parade #0 in slot #0 may include data indicating that a second parade #0 in slot #4 will occur in 3 ms. The mobile device may power off its receiver circuitry after receiving the first parade #0 transmission and power on its receiver circuitry to receive the second parade #0 (i.e., at slot #4) after 3 ms.

Figure 5:
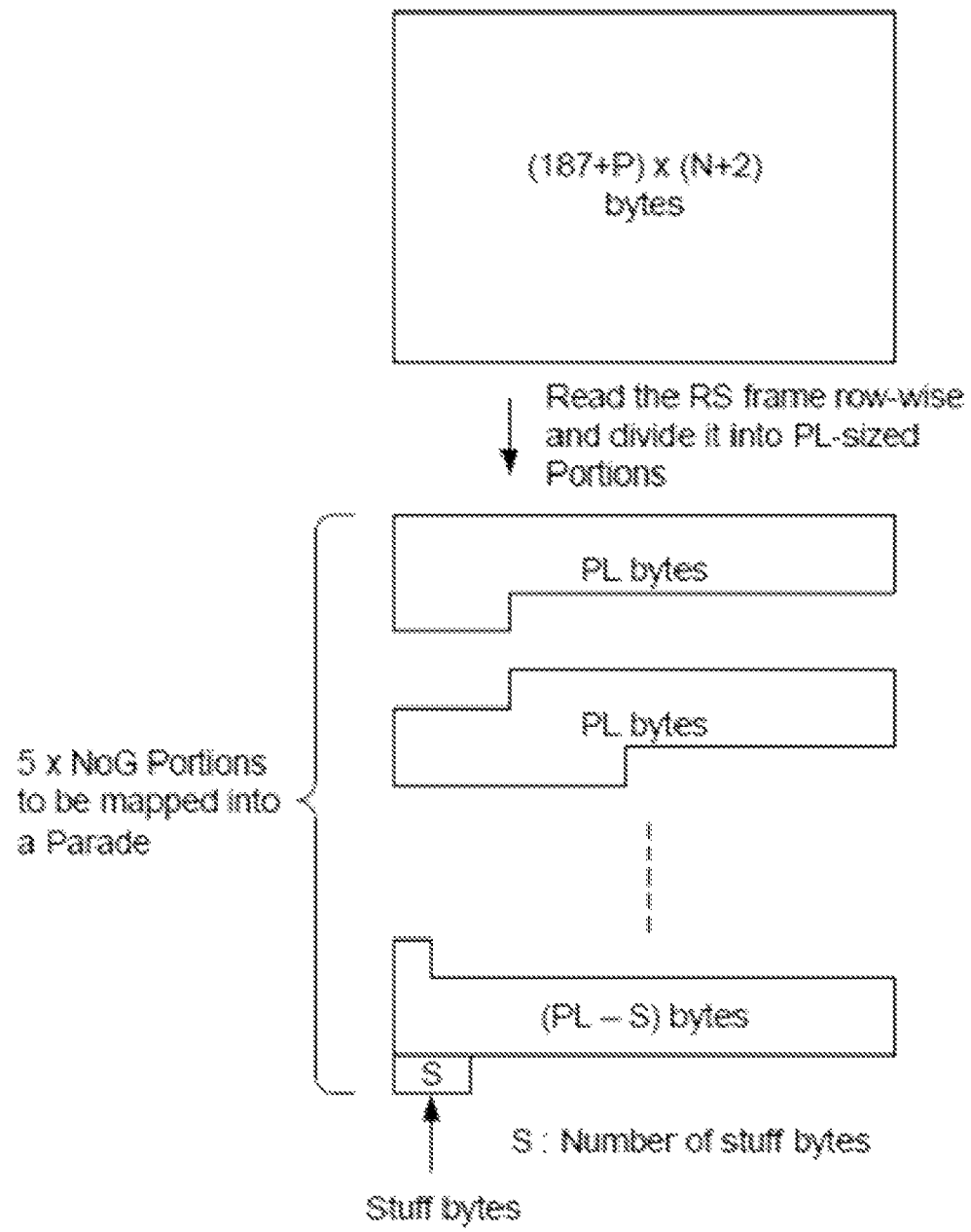
FIG. 5 is a diagram illustrating an RS frame structure of an ATSC-M/H broadcast transmission which is fragmented into 5×NoG portions.

FIG. 5 illustrates an RS frame and its NoG portions according to an embodiment. After RS and CRC encoding, the RS frame may consist of (187+P)×(N+2) bytes of data. Because the total number of bytes of a RS- and CRC-encoded RS frame is slightly less than or equal to 5×NoG×PPL, the RS frame may be divided into ((5×NoG)−1) portions of size PL bytes plus one portion of size PL or smaller. Some stuffing or padding bytes may be appended to the last portion of the encoded RS frame data if necessary to make up a final PL-sized portion. Such stuffing bits do not include meaningful data, such as all "0" or all "1" (e.g., 0xFF bytes), but are included to fill out the frame portion to support FEC mechanisms.

The number of stuffing bytes may be calculated by the following equation:

$$S=(5'\text{NoG}'PL)-(187+P)'(N+2)$$

Figure 6:
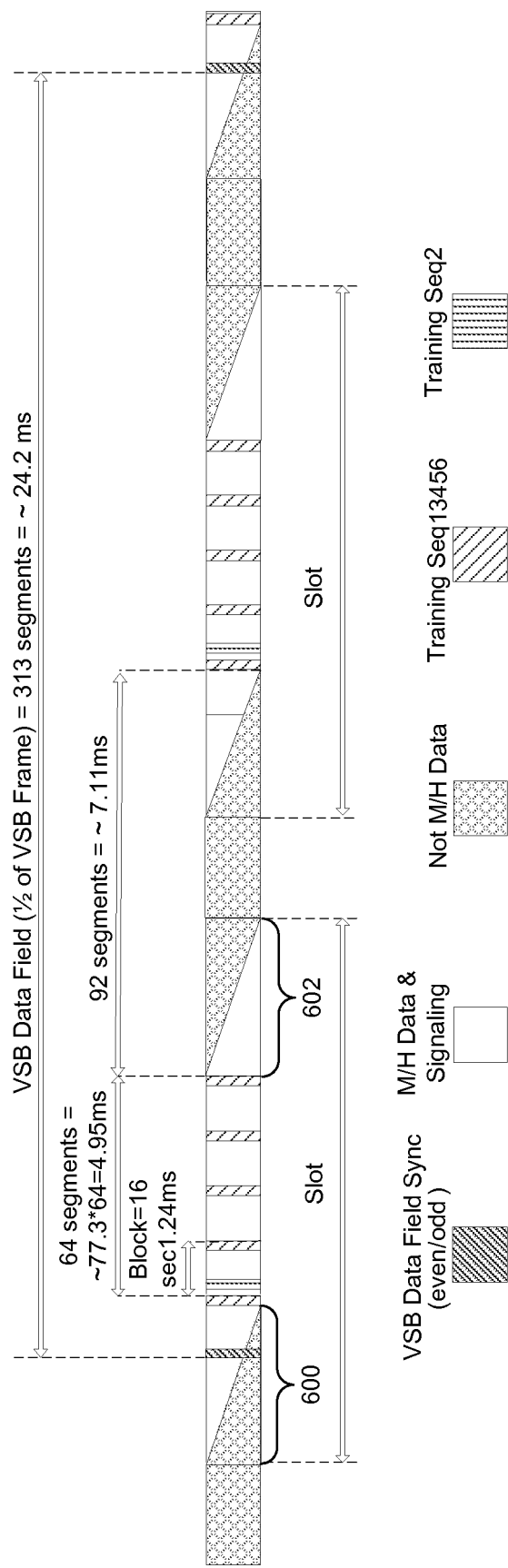
FIG. 6 is a timeline diagram illustrating an ATSC-M/H broadcast transmission of two consecutive ATSC-M/H slots.

Each portion of PL-sized data may be fed to a block processor. The main function of a block processor is an outer-encoding of the Serial Concatenated Convolutional Code (SCCC) for the output of the RS frame encoder. The operation of the block processor may include RS frame portion to SCCC block conversion, byte-to-bit conversion, convolutional encoding, symbol interleaving, symbol-to-byte conversion and SCCC block to RS block conversion. As result of the way data is encoded, interleaved and packaged into slots for transmission, the amount of M/H related data transmitted at the very beginning and very end of the slot is less than during the main duration of the slot. This is illustrated in FIG. 6 which is a time diagram showing broadcast slots according to the ATSC M/H standard. In FIG. 6 the horizontal axis represents time and the vertical axis represents segments which are broadcasted at each instant. A segment is a group of data that is transmitted and is made up of 832 symbols. The broadcast slots and incluced data are defined in multiples of segments.

An M/H slot may include two types of data: M/H data and non M/H data. To generate the M/H frame, the M/H data and non M/H data (e.g., ATSC data) are multiplexed together. As a result of this multiplexing, portions of the M/H frame may include non M/H data which is not used by the M/H data receiver device. Therefore, at the beginning and end of each M/H slot the data that is presented is a mixture of M/H and non M/H data which is illustrated by the overlapping wedge-shaped portions 600, 602.

In an M/H slot, the M/H data may include training sequences and VSB data field sync. The VSB data sync may be present in some segments but not others. The non M/H data does not include data that is useful to the M/H receiver device. Since the non M/H data included within the beginning and ending portions 600, 602 of a slot is not useful to an M/H receiver device that is, the amount of useful ATSC-M/H data in these portions is relatively small compared to the rest of the slot. Consequently, if part of the beginning and/or ending portions 600, 602 of a slot is not received, the amount of missed data may be small enough that it can be readily recovered using forward error correction codes and error correction processes.

Figure 7:
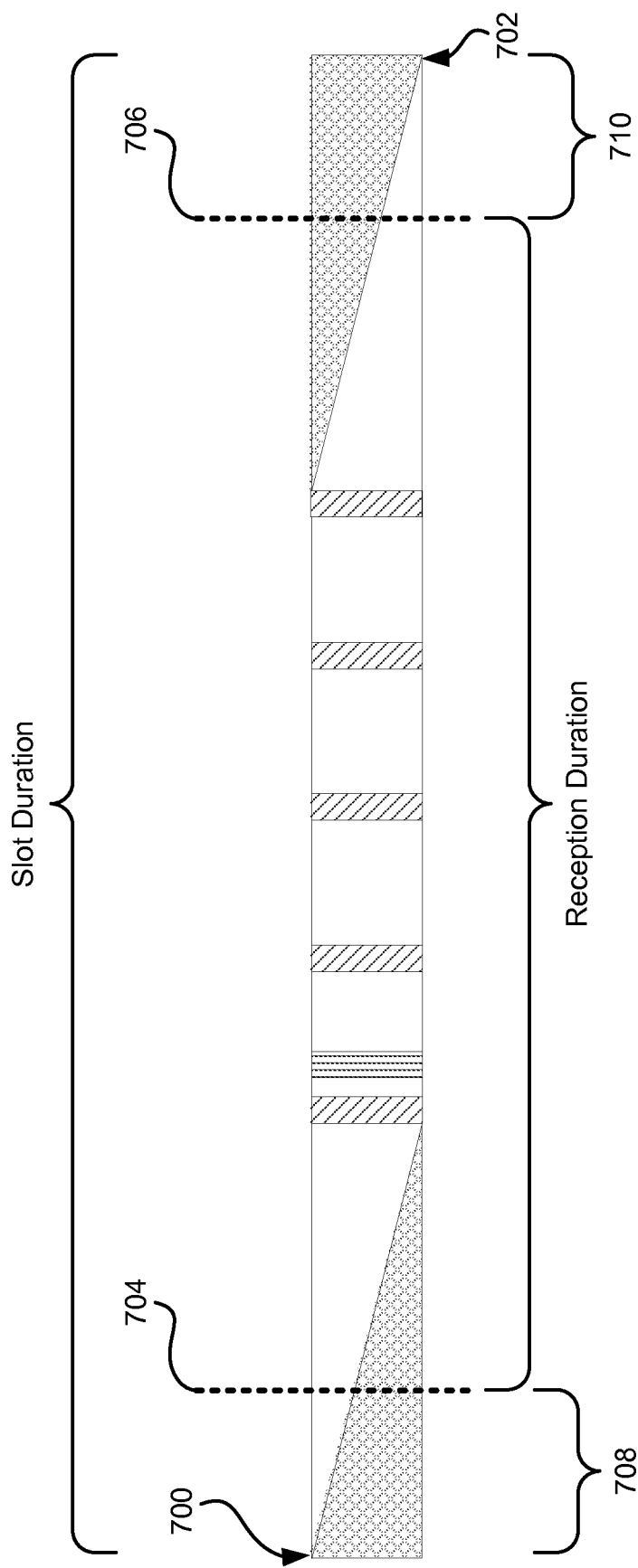
FIG. 7 is a timeline diagram illustrating an M/H slot structure of an ATSC-M/H broadcast transmission illustrating reception start and stop times according to an embodiment.

The various embodiments take advantage of the reduced amount of data present in beginning and/or ending portions 600, 602 of a transmitted slot by delaying activation of the high power reception state (i.e., with receiver circuitry energized) and entering the low power state before the slot transmission is completed so as to reduce the amount of time that the receiver device is in a high power state during each M/H slot. For example, as illustrated in FIG. 7, instead of activating the receiver circuitry at the start of a transmissions slot 700 and the activating the receiver circuitry at the end of the slot 702, the receiver circuitry is activated at delayed time 704 and the activated early at time of 706. Thus, the reception duration (i.e., the duration that the receiver circuitry is energized) is less than slot duration. As a result, some data symbols at the beginning (symbols in portion 708) and at the end of the transmissions slot (symbols in portion 710) are not received by the receiver device. In the various embodiments, this lost data in portion 708 and 710 are then recovered using error correction processing. For example, the mobile device processor may use the CRC data (which is sometimes referred to as "CRC checksum") and the RS parity that are transmitted with the M/H parade to perform error detection and error correction, respectively. Thus, the various embodiments enable ATSC-M/H mobile devices to conserve power by receiving less than the entire ATSC-M/H signals.

A variety of methods for conserving power may be used in the various embodiments. In one embodiment, power to the receiver circuitry of the mobile device may be controlled, so that the receiver circuitry is energized in the high power state and deenergized in the low power state. In another embodiment, the device clock may be gated during the low power state. In a further embodiment, voltage or current supplied to various device circuitry may be reduced in the low power state and applied at full levels in the high power state. In a further embodiment, combinations of these methods may be employed, such as de-energizing the receiver circuitry and applying clock gating in the low power state. Also, other methods of conserving power may be implemented in the low power state. For ease of description, some of the descriptions herein refer to energizing and de-energizing the receiver circuitry instead of entering a high power state and a low power state. Such references are intended as examples, and not as limiting descriptions.

In the various embodiments, the delay in activating the receiver circuitry and the deactivation times may be adjusted so that the number of symbols not received depends upon the quality of the received signal. If the signal is being received with high quality such that little data is being lost due to noise, interference or fading, then the mobile device can recover more lost symbols using error correction techniques, enabling the intentionally lost data (i.e., data portions 708 and 710) to be larger. However, if the received signal suffers from interference, a weak signal or severe fading, the receiver circuitry may be activated/deactivated closer to or at the start and stop times 700, 702 of the slot because the error correction processing is required to recover data within the main portion of the slot. The lower the quality of the transmission, the more information the mobile device process requires to interpret the received signals. Thus, in an embodiment the mobile device processor may monitor the error rate of received slots and adjust the slot reception duration (or clipping duration) to maintain a consistent ability to recover all of the data within each transmission slot as well as reduce power consumption by the receiver circuitry. Further, the duration that the slot reception may be clipped at the start (portion 708) and at the end (portion 710) may be the same or different. Whether the slot reception is symmetrically or asymmetrically clipped may depend on several factors including the quality of reception of the transmission or the number of erroneous bits that may exist in the M/H slot transmission.

In the various embodiments, mobile devices may be configured to enter a low power state, such as by switching different processing components off, when those components are not required in order to conserve power. Since RF receiver circuitry consumes a lot of power relatively speaking, maintaining this circuitry in the off state for the maximum amount of time provides an effective low power state that enables the mobile device to conserve a significant amount of power. In addition, activating and deactivating the RF receiver circuitry, in a low power state the processor of the device may deactivate circuitry associated with converting received signals into digital format, processing the received signals to recognize and recover data symbols and error correction processing. Such processing circuitry may be cycled on and off depending upon whether they are actively engaged in processing received slot data. Thus, the error correction processing circuitry may be energize for a time after the RF receiver circuitry has been de-energized since such processing will continue for a period of time to recover the intentionally lost data. As discussed above, a low power state may further be accomplished by employing other methods in combination or alternatively.

While most of the data transmitted during times 708 and 710 while is non M/H data, some M/H data may is lost. This lost data is recovered using the standard error correction processing enable by the ATSC M/H transmission protocol and receiver device processing. Thus, the lost data may be treated just like any other lost symbols that occur due to fading or interference. To ensure that the error correction processing is not overwhelmed (i.e., presented with more lost data than the processing can recover), the mobile device processor may be configured to determine the conditions under which data is being received in order to determine how much of a transmission slot can be intentionally lost or clipped. Thus, under good reception conditions, when bits are not being lost due to noise, fading or other reception problems, a mobile device processor may be configured to determine the maximum number of symbols that may be clipped from the start and end of transmission slots in order to conserve power. However, if the receiver device determines that reception conditions are poor, such as may be indicated by a high error rate in received symbols, the mobile device processor may be configured to reduce the number of symbols that are intentionally clipped, or to receive the entire transmitted slot in order to provide acceptable reception quality at the expense of increased power consumption.

In an embodiment mobile device processors may be further configured to enter a low power state, such as by deactivating the receiver circuitry, so that RS parity data is intentionally not received. Such RS parity data includes redundant information that arrives in M/H slots after the payload data is received. Generally, each M/H parade may transmit several M/H slots including only RS parity data at the end of the M/H parade transmission. RS parity allows mobile device processors to run error detection and correction functions. Because, most of the information contained in a RS parity may be found in different M/H slots that are received by the receiver device, once the entire payload is received, the mobile device processor may be configured to determine that the payload is corrected by the error correction processors or by checking the CRC data and determine that the payload requires no additional corrections by RS parity error correction mechanism. When no more correction calculations are required to recover the received payload, the receiver device processor may turn off the receiver circuitry for the remainder of the transmission slots containing only RS parity.

In a further embodiment, when RS parity data is required to correct errors in the received payload, the mobile device processor may be configured to continue receiving M/H slots with RS parity data, run correction calculations and reevaluate whether more RS parity data is required. The mobile device processor may continue this process and reevaluate the need for receiving additional RS parities until all the errors are detected and corrected, or the frame reception is completed. Once all the data is corrected, the mobile device processor may turn off the receiver circuitry to conserve power. If the end of the frame is reached (i.e., frame reception is completed), the mobile device processor may turn off the receiver circuitry to conserve power in the conventional manner.

In situations where the mobile device receives ATSC-M/H parades with dual ensembles, the error correctness validation may require all ensembles to be validated independently. The ATSC-M/H A/153 standard provides two transmission options, namely transmitting payload data in a single RS Frame and transmitting payload data in two RS Frames. When payload data (actual transmitted data) is split between RS Frames, the RS Frames are referred to as "ensembles." In such transmissions, each ensemble has its own frame, CRC data, RS bytes, etc. Each ensemble is independent from the coding point of view, but they share the same slots and belong to same transmission (e.g., TV channel). In the dual ensemble situation, the primary ensemble uses the center portions of the slots and the secondary ensemble uses the slot edges. Thus, when the various embodiments clip a portion of the beginning and end of a slot by starting reception late and ending reception early, the payload data not received will be from the secondary ensemble. The various embodiments may take into account the parameters and error correction data associated with both ensembles in the case of dual ensemble transmissions. For example, the embodiments will not impact reception of the primary ensemble, but may rely upon the stronger error correction coding that is included with the secondary ensemble. Also, since the RS bytes are at the end, the slots with only RS bytes will be at the end of both frames but not necessarily start at same slot.

To conserve power using the various embodiments, a mobile device may be equipped with switches which may connect each mobile device receiver circuitry and processing components to a power source. For example, a mobile device processor may be configured to determine when power should be cut or reduced to particular circuit elements to conserve power, and cause switches between the power source and those circuit elements to open or close. As mentioned above, other power saving methods may also be used in the various embodiments, such as clock gating and power drop, etc., which may be implemented with circuits that may not include switches between the power source, and instead may involve circuits to regulate power, establish different operating modes, etc.

Figure 8:
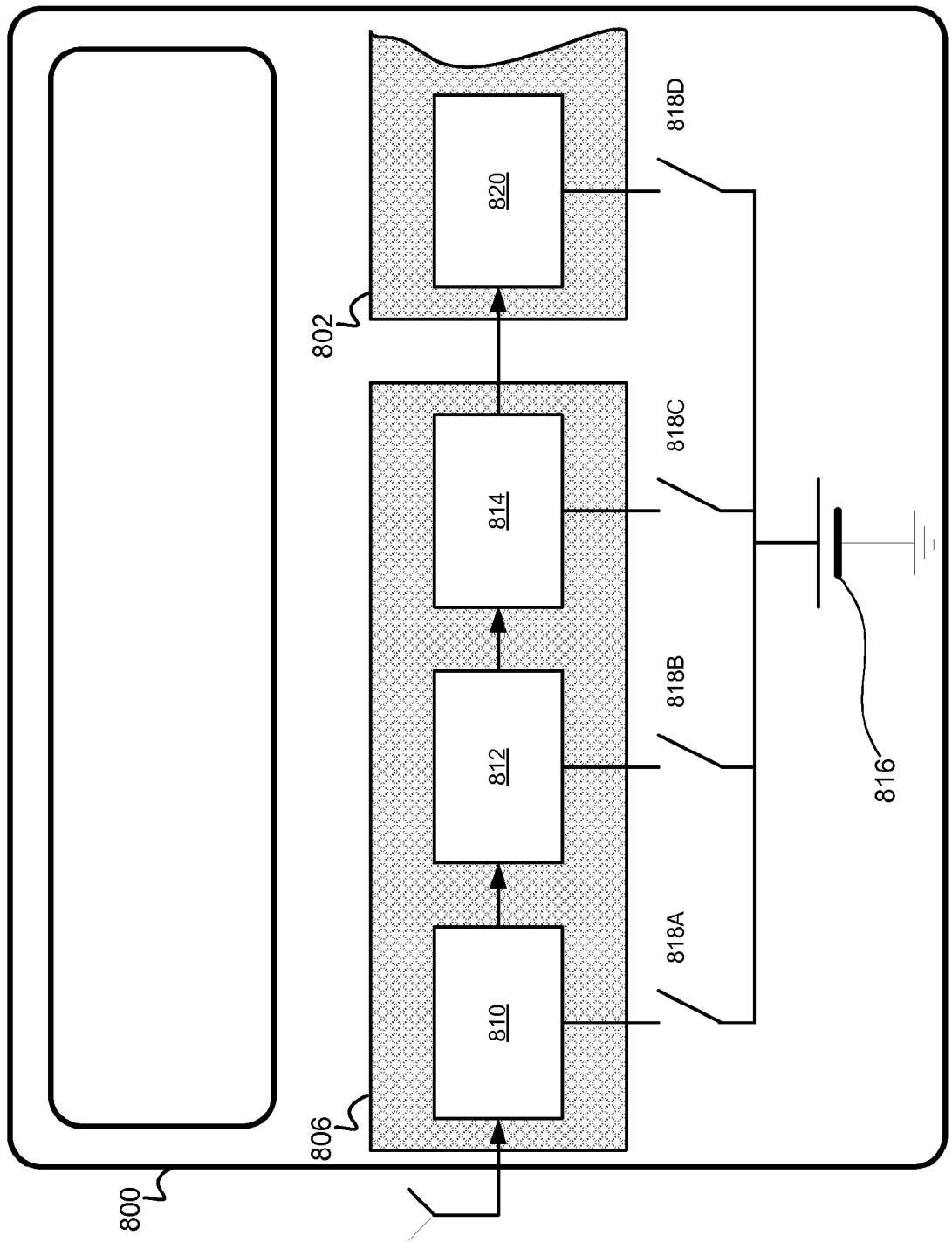
FIG. 8 is a component block diagram of a portion of an ATSC-M/H transmission receiver in a mobile device suitable for use with the various embodiments.

FIG. 8 a block diagram of an embodiment mobile device 800 which, inter alia, may include an ATSC-M/H digital broadcast receiver circuitry 806 (e.g., a receiver chip or module) coupled to a processor 802. The receiver circuitry 806 may include an RF receiver circuit 810, an analog to digital converter 812, and digital signal processing circuits 814 coupled to the processor 802. The processor 802 may include a protocol and video processing component 820 which may process data received from the ATSC-M/H transmission. Each of the components of the receiver circuitry 806 and the processor 802 may be coupled to a power source 816 (e.g., a battery) through one or more processor-controlled switches 818A, 818B, 818C and 818D. For example, switch 818A may be located between the power source and the RF receiver circuitry 810. By turning off a switch the mobile device 800 may stop the flow of power to one of its components. For example, turning off the switch 818A interrupts power to the RF receiver circuitry 810. Switches 818B, 818C and 818D work in the similar manner allowing the mobile device to energize/de-energize the analog to digital converter 812, digital processing circuitry and protocol 814 and video processing components 820, respectively. As mentioned above, the various embodiments may employ other power saving methods which may be implemented with circuits different from those illustrated in FIG. 8.

In an embodiment, a mobile device may have more than one power source 816. In such implementations, the mobile device processor may be configured to turn off some or all power supplies depending on the connected components. One or several of the power sources 816 may be turned off simultaneously or at different times to conserve the maximum amount of power possible while receiving ATSC-M/H broadcast transmissions.

Figure 9:
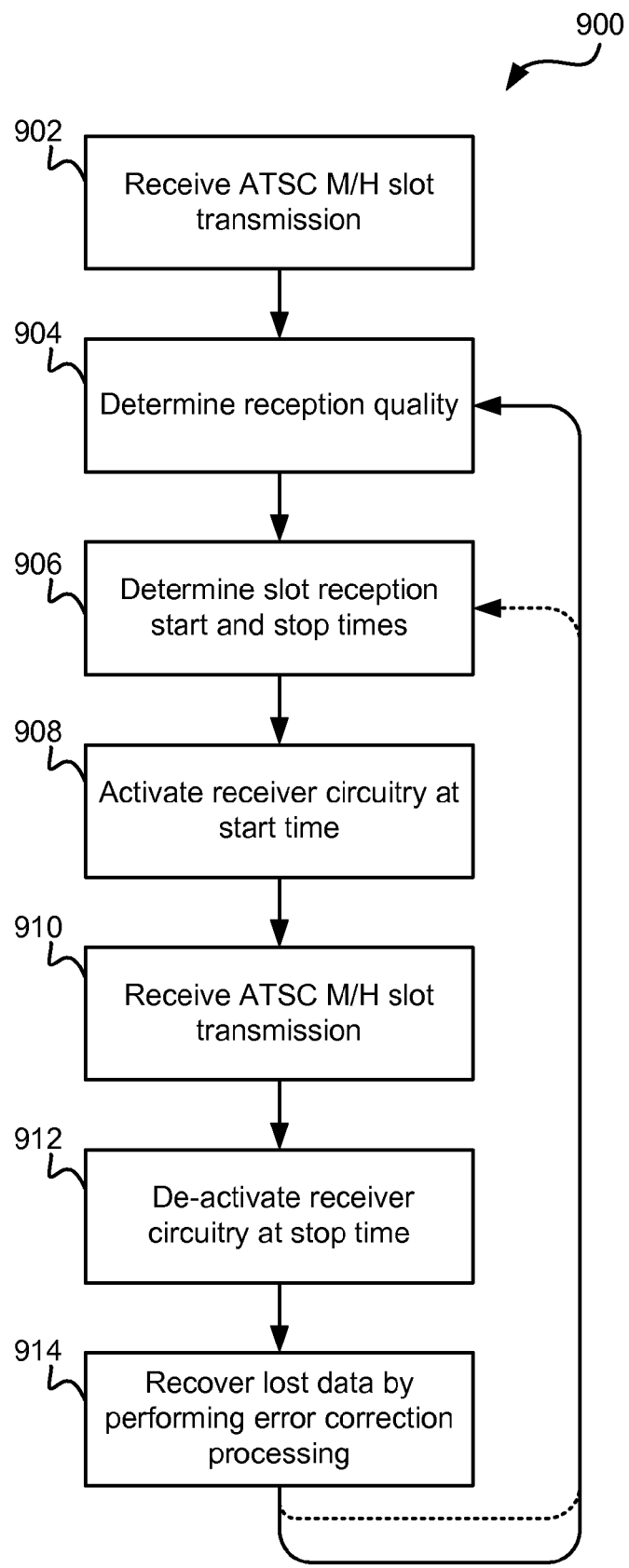
FIG. 9 is a process flow diagram of an embodiment method for conserving power during receipt of ATSC-M/H broadcast transmission.

FIG. 9 illustrates an embodiment method 900 for reducing power consumption by clipping symbols at the beginning and end of an M/H slot. In method 900 at step 902, the receiver device RF receiver circuitry may receive M/H slot transmissions, and determine the quality of the received transmissions in determination step 904. This determination may be based upon the detected error rate, a signal-to-noise ratio measurement, a channel-to-noise ratio measurement, a Doppler spread evaluation, a signal strength measurement, and combinations thereof. The determination may be based upon past and current information or a combination of past and current information. In step 906, the receiver device processor may determine the appropriate slot reception start and stop times based upon the determined signal reception quality. As discussed above with reference to FIG. 7, this operation may involve determining a time to activate the receiver circuitry based upon the reception quality and the start time for the M/H slot, and determining a time to deactivate the receiver circuitry based upon the reception quality and the ending time for the M/H slot. The determined time for activating the receiver circuitry may also take into account the deactivate time required to fully energize receiver circuit and allow the circuit to settle down sufficient to accurately receive the transmission signals. In step 908, the device processor may activate the receiver circuitry at the determined slot reception start time. As described above, this may involve closing a switch to provide battery power to the receiver circuitry at the start time determined in step 906.

In step 910, the receiver circuitry may receive the ATSC M/H slot transmission data and pass the received signals to the signal processing circuit elements within the receiver device. In step 912, the device processor may deactivate the receiver circuitry at the determined reception stop time. As described above, this may involve opening a switch to remove battery power from the receiver circuitry at the stop time determined in step 906. In step 914, the device processor may perform error correction processing on the received slot data in order to recover any data that was lost due the receiver circuitry being off or due to fading or interference. When the entire slot transmission payload data is recovered from the received signal, the data may be passed to the processor for use in the ordinary manner. As part of step 914, the processor may note the number of errors corrected as well as other indicators of the reception quality. The processor may then return to step 904 to again determine the reception quality based upon the received slot data and/or error correction results, and proceed to receive the next slot of transmission data by executing steps 906 through 914 in a continuous loop. In an embodiment, the processor may not determine the reception quality for every slot, and instead periodically determine reception quality (e.g., determining reception quality every 5 to 10 seconds), in which case the processor may return to step 906 to determine the next slot reception start and stop times based on information received in the last transmission slot in the previously determined reception quality.

Figure 10:
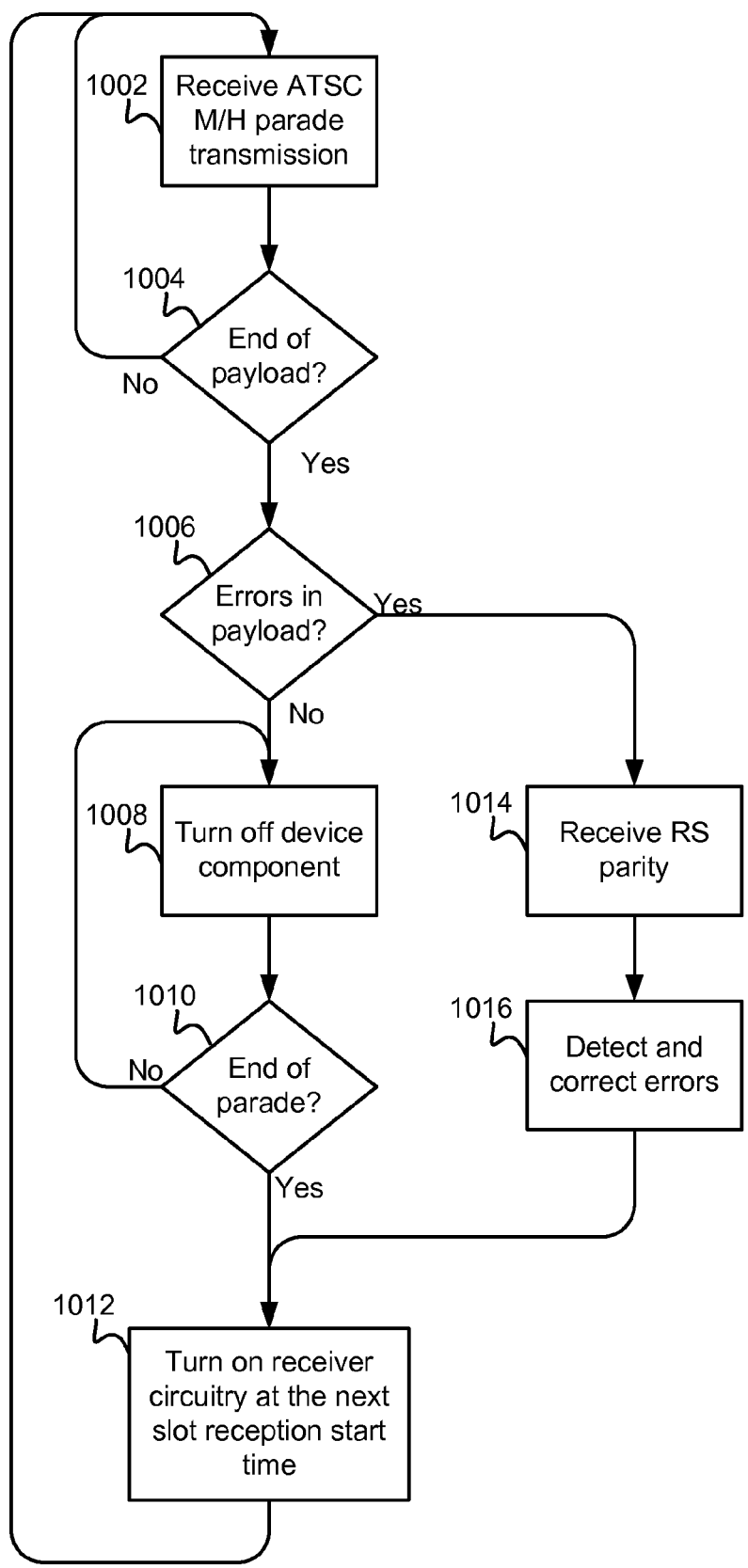
FIG. 10 is a process flow diagram of an embodiment method for conserving power during receipt of ATSC-M/H broadcast transmission.

FIG. 10 illustrates an embodiment method 1000 for conserving power by turning power off to receiver circuitry when the transmission includes only RS parity data that is not required to receive the current payload. In method 1000, a mobile device processor may receive ATSC-M/H parade transmission in step 1002, and determine whether a payload has been fully received in determination step 1004. If the end of the payload has not been reached (i.e., determination step 1004="No"), the mobile device processor may continue to receive ATSC-M/H parade transmission. Once the end of the payload is reached (i.e., determination step 1004="Yes"), the mobile device processor may determine whether there are errors in the received payload, determination step 1006. For example, the mobile device processor may determine whether payload has any errors by comparing the CRC data to the received data. If the payload does not include any errors (i.e., determination step 1006="No"), the mobile device 700 may turn off power to receiver circuitry which receives and processes ATSC-M/H slots when the transmission only includes RS parity data in step 1008. The mobile device processor may then determine whether the ATSC-M/H parade has ended in determination step 1010. If the ATSC-M/H parade has not ended (i.e., determination step 1010="No"), the mobile device processor may maintain the receiver circuitry in the off state. Once the ATSC-M/H parade ends (i.e., determination step 1010="Yes"), the mobile device processor may turn on power to the receiver circuitry at the next slot reception start time in step 1012, and return to receiving the next ATSC-M/H parade transmissions in step 1002.

If the advice processor determines that there are errors in the received payload (i.e., determination step 1006="Yes"), the mobile device processor may continue to receive ATSC-M/H slots including RS parity data in step 1014, and use the extra received RS parity data to detect and correct errors in the received payload in step 1016. The receiver device processor may continue receiving data by turning on power to the receiver circuitry at the next slot reception start time in step 1012, and receiving the next ATSC-M/H parade transmissions in step 1002.

In a further embodiment, to conserve power, a mobile device 800 may be configured to employ both processes described above with reference to FIGS. 9 and 10. Accordingly, a mobile device 800 may be configured to simultaneously, de-activate/re-activate the ATSC-M/H receiver device 806 of the mobile device 800 based on the received M/H slots and turn off the ATSC-M/H receiver device 806 after the entire payload has been received. By combining these two processes, the mobile device 800 may be able to conserve more power than possible using any one of the methods alone.

Figure 11:
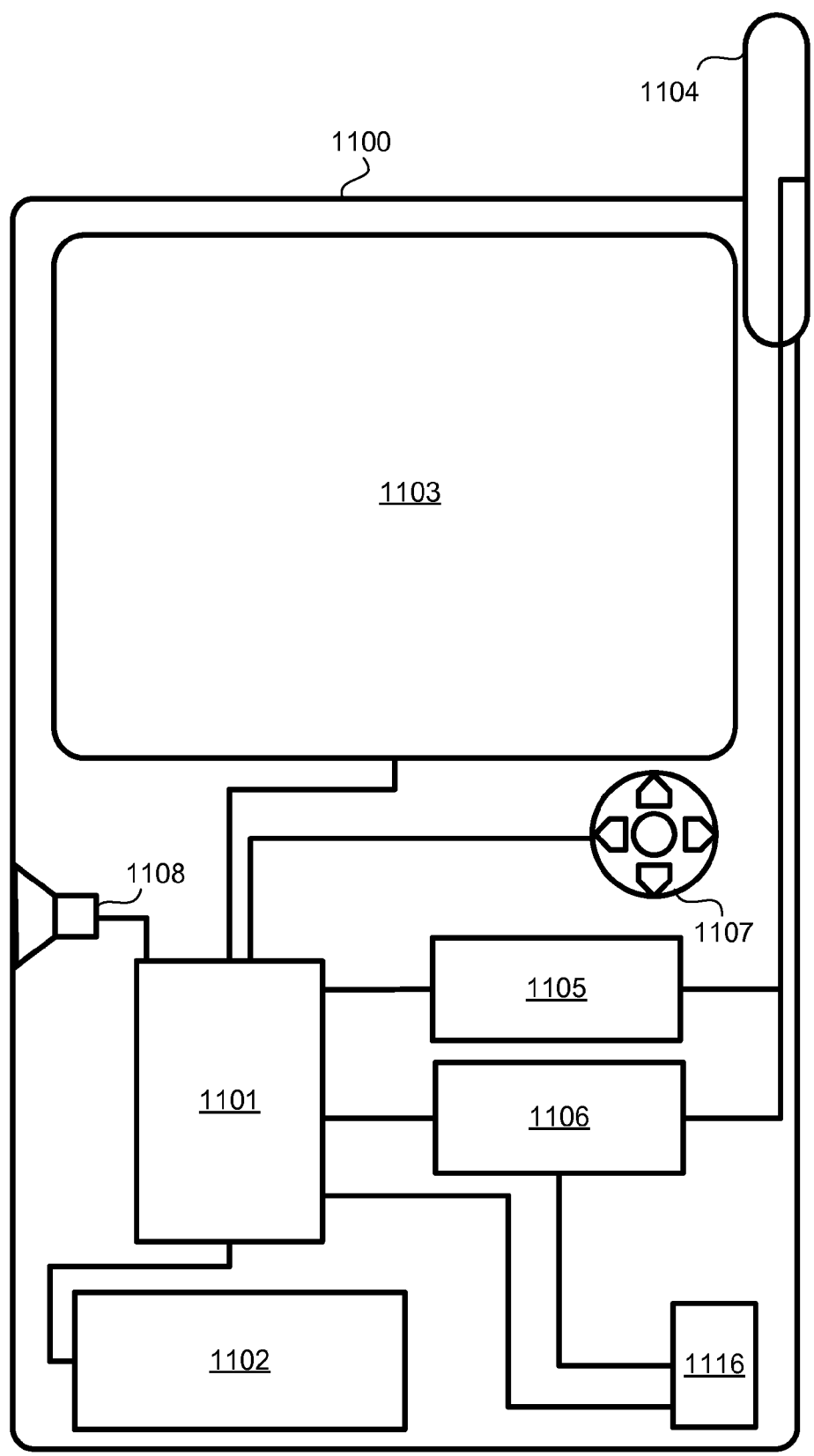
FIG. 11 is a component block diagram of an ATSC-M/H mobile device suitable for use with the various embodiments.

FIG. 11 is a system block diagram of a mobile device 1100 suitable for receiving ATSC transmissions in accordance with any of the embodiments. A typical mobile device 1100 may include a processor 1101 coupled to internal memory 1102, a display 1103, and to a speaker 1108. Additionally, the mobile device 1100 will include an antenna 1104 for sending and receiving electromagnetic radiation that may be connected to a wireless data link and/or cellular telephone transceiver 1105 coupled to the processor 1101 and an ATSC receiver 1106 coupled to the processor 1101. The processor 1101 and ATSC receiver 1106 are connected to a power source 1116. Mobile devices 1100 typically also include menu selection buttons or rocker switches 1107 for receiving user inputs.

Decoding of ATSC M/H signals using the various embodiments may be performed by the ATSC M/H receiver 1106 and portions of the processor 1101, and memory 1102. The ATSC M/H receiver 1106 may include an RF circuit 810, digital to analog converter 812 and a digital circuit 814 all coupled to a power source 816 through switches 818A, 818B and 818C as described with reference to FIG. 8. The processor 1101 may include a protocol and video processing 820 which in turn may also be coupled to the power source 816 through a switch 818D.

Alternatively dedicated modules within or coupled to the multimedia broadcast receiver 1106 may perform the embodiment methods. In other alternative embodiments, the methods may be performed by the processor 1101, after the ATSC M/H signal is received.

While FIG. 11 illustrates a mobile device, fixed receiver devices, such as digital televisions configured to receive the ATSC M/H transmissions may also benefit from the various embodiments, and will include the same or similar components as those illustrated in FIG. 11. Thus, the example shown in FIG. 11 is not intended to limit the scope of the claims to mobile devices 1100.

The processors 1101 may be any programmable microprocessor, microcomputer or multiple processor chip or chips that can be configured by software instructions (applications) to perform a variety of functions, including the functions of the various embodiments described below. In some mobile devices 1100, multiple processors 1101 may be provided, such as one processor dedicated to wireless communication functions and one processor dedicated to running other applications. Typically, software applications may be stored in the internal memory 1102 before they are accessed and loaded into the processor 8 1101. The processor is that no one may include internal memory sufficient to store the application software instructions.

A further embodiment may be in the form of an ATSC M/H receiver integrated circuit ("chip") 1106 that includes within the chip a radio frequency receiver circuit coupled to a signal processor, such as a digital signal processor (DSP), configured with DSP-executable instructions to perform operations of various embodiment methods described above.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a tangible or non-transitory computer-readable storage medium. Computer-readable storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also can be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for conserving energy in an ATSC M/H receiver device, comprising:
    determining a slot receive time and a slot reception stop time, wherein the determined slot receive time is after a start time of an ATSC M/H slot, and the determined the reception stop time is before the end time of the ATSC M/H slot;
    entering a high power state of the receiver device at the determined slot receive time, receiving ATSC M/H slot data, and entering a low power state of the receiver device at the determined reception stop time; and
    using error correction processing to recover data that was not received during the time between the start time of the ATSC M/H slot and the slot receive time and during the time between the slot reception stop time and the end of the ATSC M/H slot.

2. The method of claim 1, wherein:
    entering the high power state comprises activating the receiver circuitry of the receiver device; and
    entering the low power state comprises deactivating the receiver circuitry of the receiver device.

3. The method of claim 1, further comprising determining the quality of the received ATSC-M/H signal, wherein determining the slot receive time and slot reception stop time are based upon the determined quality of the ATSC-M/H signal.

4. The method of claim 3, wherein slot reception stop time is determined to be later and the slot receive time is determined to be earlier when the received ATSC-M/H signal is determined to be good than when the received ATSC-M/H signal is determined to be bad.

5. The method of claim 3, wherein determining the slot receive time and slot reception stop time based upon the determined quality of the ATSC-M/H signal comprises determining slot receive and the slot reception stop times which enable error correction processing to recover all payload data in the received ATSC-M/H signal while minimizing time that the receiver device is in a high power state.

6. The method of claim 5, wherein the slot receive time is set to the start time of the ATSC M/H slot and the slot reception stop time is set to the end of the ATSC M/H slot when the determined quality of the received ATSC-M/H signal is such that the error correction processing cannot recover the payload data without receiving the entire ATSC M/H slot.

7. The method of claim 5, wherein the quality of the received ATSC-M/H signal is determined for every ATSC-M/H slot.

8. The method of claim 5, wherein the quality of the received ATSC-M/H signal is determined periodically.

9. The method of claim 3, wherein determining the quality of the received ATSC-M/H signal is based upon one or more of a detected error rate, a signal-to-noise ratio measurement, a channel-to-noise ratio measurement, a Doppler spread evaluation, and a signal strength measurement.

10. The method of claim 1, further comprising:
determining whether an entire payload of the ATSC-M/H slot has been received and recovered; and
entering the low power state of the receiver device when it is determined that the entire payload of the ATSC-M/H slot has been received and recovered.

11. The method of claim 1, further comprising:
receiving portions of the ATSC-M/H slots containing RS parity data;
accomplishing error correction calculations using the received RS parity data;
determining whether more RS parity data is required to recover the data not received during the time between the start time of the ATSC M/H slot and the slot receive time and during the time between the current time and the end of the ATSC M/H slot; and
entering the low power state of the receiver device when it is determined that no more RS parity data is required to recover payload data in the ATSC M/H slot.

12. The method of claim 1, further comprising:
determining whether an end of a payload in the ATSC-M/H parade transmission has been reached;
determining whether a received payload includes errors when the end of the payload is reached;
turning off the receiver circuit of the receiver device to conserve power when the end of the payload is reached if it is determined that the received payload does not include errors.

13. A mobile receiver device capable of receiving ATSC M/H format transmissions, comprising:
a processor; and
a receiver circuit coupled to the processor and configured to receive ATSC M/H format wireless transmissions,
wherein the processor is configured with processor-executable instructions to perform operations comprising:
determining a slot receive time and a slot reception stop time, wherein the determined slot receive time is after a start time of an ATSC M/H slot, and the determined the reception stop time is before the end time of the ATSC M/H slot;
entering a high power state of the receiver device at the determined slot receive time, receiving ATSC M/H slot data, and entering a low power state of the receiver device at the determined reception stop time; and
using error correction processing to recover data that was not received during the time between the start time of the ATSC M/H slot and the slot receive time and during the time between the slot reception stop time and the end of the ATSC M/H slot.

14. The mobile receiver device of claim 13, wherein the processor is configured with processor-executable instructions to perform operations such that:
entering the high power state comprises activating the receiver circuitry of the receiver device; and
entering the low power state comprises deactivating the receiver circuitry of the receiver device.

15. The mobile receiver device of claim 13, wherein the processor is configured with processor-executable instructions to perform operations further comprising determining the quality of the received ATSC-M/H signal, wherein determining the slot receive time and slot reception stop time are based upon the determined quality of the ATSC-M/H signal.

16. The mobile receiver device of claim 15, wherein the processor is configured with processor-executable instructions to perform operations such that slot reception stop time is determined to be later and the slot receive time is determined to be earlier when the received ATSC-M/H signal is determined to be good than when the received ATSC-M/H signal is determined to be bad.

17. The mobile receiver device of claim 15, wherein the processor is configured with processor-executable instructions to perform operations such that determining the slot receive time and slot reception stop time based upon the determined quality of the ATSC-M/H signal comprises determining slot receive and the slot reception stop times which enable error correction processing to recover all payload data in the received ATSC-M/H signal while minimizing time that the receiver device is in a high power state.

18. The mobile receiver device of claim 17, wherein the processor is configured with processor-executable instructions to perform operations such that the slot receive time is set to the start time of the ATSC M/H slot and the slot reception stop time is set to the end of the ATSC M/H slot when the determined quality of the received ATSC-M/H signal is such that the error correction processing cannot recover the payload data without receiving the entire ATSC M/H slot.

19. The mobile receiver device of claim 17, wherein the processor is configured with processor-executable instructions to perform operations such that the quality of the received ATSC-M/H signal is determined for every ATSC-M/H slot.

20. The mobile receiver device of claim 17, wherein the processor is configured with processor-executable instructions to perform operations such that the quality of the received ATSC-M/H signal is determined periodically.

21. The mobile receiver device of claim 15, wherein the processor is configured with processor-executable instructions to perform operations such that determining the quality of the received ATSC-M/H signal is based upon one or more of a detected error rate, a signal-to-noise ratio measurement, a channel-to-noise ratio measurement, a Doppler spread evaluation, and a signal strength measurement.

22. The mobile receiver device of claim 13, wherein the processor is configured with processor-executable instructions to perform operations further comprising:
determining whether an entire payload of the ATSC-M/H slot has been received and recovered; and
entering the low power state of the receiver device when it is determined that the entire payload of the ATSC-M/H slot has been received and recovered.

23. The mobile receiver device of claim 13, wherein the processor is configured with processor-executable instructions to perform operations further comprising:
receiving portions of the ATSC-M/H slots containing RS parity data;
accomplishing error correction calculations using the received RS parity data;
determining whether more RS parity data is required to recover the data not received during the time between the start time of the ATSC M/H slot and the slot receive time and during the time between the current time and the end of the ATSC M/H slot; and
entering the low power state of the receiver device when it is determined that no more RS parity data is required to recover payload data in the ATSC M/H slot.

24. The mobile receiver device of claim 13, wherein the processor is configured with processor-executable instructions to perform operations further comprising:
  determining whether an end of a payload in the ATSC-M/H parade transmission has been reached;
  determining whether a received payload includes errors when the end of the payload is reached;
  turning off the receiver circuit of the receiver device to conserve power when the end of the payload is reached if it is determined that the received payload does not include errors.

25. A mobile receiver device capable of receiving ATSC M/H format transmissions, comprising:
  means for determining a slot receive time and a slot reception stop time, wherein the determined slot receive time is after a start time of an ATSC M/H slot, and the determined the reception stop time is before the end time of the ATSC M/H slot;
  means for entering a high power state of the receiver device at the determined slot receive time, receiving ATSC M/H slot data, and entering a low power state of the receiver device at the determined reception stop time; and
  means for using error correction processing to recover data that was not received during the time between the start time of the ATSC M/H slot and the slot receive time and during the time between the slot reception stop time and the end of the ATSC M/H slot.

26. The mobile receiver device of claim 25, wherein:
  means for entering the high power state comprises means for activating the receiver circuitry of the receiver device; and
  means for entering the low power state comprises means for deactivating the receiver circuitry of the receiver device.

27. The mobile receiver device of claim 25, further comprising means for determining the quality of the received ATSC-M/H signal,
  wherein means for determining a slot receive time and a slot reception stop time comprises means for determining the slot receive time and slot reception stop time based upon the determined quality of the ATSC-M/H signal.

28. The mobile receiver device of claim 27, wherein means for determining a slot receive time and a slot reception stop time comprises means for determining the slot reception stop time to be later and the slot receive time to be earlier when the received ATSC-M/H signal is determined to be good than when the received ATSC-M/H signal is determined to be bad.

29. The mobile receiver device of claim 27, wherein means for determining the slot receive time and slot reception stop time based upon the determined quality of the ATSC-M/H signal comprises means for determining slot receive and the slot reception stop times which enable error correction processing to recover all payload data in the received ATSC-M/H signal while minimizing time that the receiver device is in a high power state.

30. The mobile receiver device of claim 29, wherein means for determining a slot receive time and a slot reception stop time comprises means for setting the slot receive time to the start time of the ATSC M/H slot and setting the slot reception stop time to the end of the ATSC M/H slot when the determined quality of the received ATSC-M/H signal is such that the error correction processing cannot recover the payload data without receiving the entire ATSC M/H slot.

31. The mobile receiver device of claim 29, wherein the processor is configured with processor-executable instructions to perform operations such that the quality of the received ATSC-M/H signal is determined for every ATSC-M/H slot.

32. The mobile receiver device of claim 29, wherein means for determining the quality of the received ATSC-M/H signal comprises means for determining the quality of the received ATSC-M/H signal periodically.

33. The mobile receiver device of claim 27, wherein means for determining the quality of the received ATSC-M/H signal comprises means for determining the quality of the received ATSC-M/H signal based upon one or more of a detected error rate, a signal-to-noise ratio measurement, a channel-to-noise ratio measurement, a Doppler spread evaluation, and a signal strength measurement.

34. The mobile receiver device of claim 25, further comprising:
  means for determining whether an entire payload of the ATSC-M/H slot has been received and recovered; and
  means for entering the low power state of the receiver device when it is determined that the entire payload of the ATSC-M/H slot has been received and recovered.

35. The mobile receiver device of claim 25, further comprising:
  means for receiving portions of the ATSC-M/H slots containing RS parity data;
  means for accomplishing error correction calculations using the received RS parity data;
  means for determining whether more RS parity data is required to recover the data not received during the time between the start time of the ATSC M/H slot and the slot receive time and during the time between the current time and the end of the ATSC M/H slot; and
  means for entering the low power state of the receiver device when it is determined that no more RS parity data is required to recover payload data in the ATSC M/H slot.

36. The mobile receiver device of claim 25, further comprising:
  means for determining whether an end of a payload in the ATSC-M/H parade transmission has been reached;
  means for determining whether a received payload includes errors when the end of the payload is reached;
  means for turning off the receiver circuit of the receiver device to conserve power when the end of the payload is reached if it is determined that the received payload does not include errors.

37. A non-transitory processor-readable storage medium having stored thereon processor-executable instructions configured to cause a processor of a mobile receiver device capable of receiving ATSC M/H format transmissions to perform operations comprising:
  determining a slot receive time and a slot reception stop time, wherein the determined slot receive time is after a start time of an ATSC M/H slot, and the determined the reception stop time is before the end time of the ATSC M/H slot;
  entering a high power state of the receiver device at the determined slot receive time, receiving ATSC M/H slot data, and entering a low power state of the receiver device at the determined reception stop time; and
  using error correction processing to recover data that was not received during the time between the start time of the ATSC M/H slot and the slot receive time and during the time between the slot reception stop time and the end of the ATSC M/H slot.

38. The non-transitory processor-readable storage medium of claim 37, wherein the stored processor-executable instructions are configured to cause a processor of a mobile receiver device to perform operations such that:
    entering the high power state comprises activating the receiver circuitry of the receiver device; and
    entering the low power state comprises deactivating the receiver circuitry of the receiver device.

39. The non-transitory processor-readable storage medium of claim 37, wherein the stored processor-executable instructions are configured to cause a processor of a mobile receiver device to perform operations further comprising determining the quality of the received ATSC-M/H signal, wherein determining the slot receive time and slot reception stop time are based upon the determined quality of the ATSC-M/H signal.

40. The non-transitory processor-readable storage medium of claim 39, wherein the stored processor-executable instructions are configured to cause a processor of a mobile receiver device to perform operations such that slot reception stop time is determined to be later and the slot receive time is determined to be earlier when the received ATSC-M/H signal is determined to be good than when the received ATSC-M/H signal is determined to be bad.

41. The non-transitory processor-readable storage medium of claim 39, wherein the stored processor-executable instructions are configured to cause a processor of a mobile receiver device to perform operations such that determining the slot receive time and slot reception stop time based upon the determined quality of the ATSC-M/H signal comprises determining slot receive and the slot reception stop times which enable error correction processing to recover all payload data in the received ATSC-M/H signal while minimizing time that the receiver device is in a high power state.

42. The non-transitory processor-readable storage medium of claim 41, wherein the stored processor-executable instructions are configured to cause a processor of a mobile receiver device to perform operations such that the slot receive time is set to the start time of the ATSC M/H slot and the slot reception stop time is set to the end of the ATSC M/H slot when the determined quality of the received ATSC-M/H signal is such that the error correction processing cannot recover the payload data without receiving the entire ATSC M/H slot.

43. The non-transitory processor-readable storage medium of claim 41, wherein the stored processor-executable instructions are configured to cause a processor of a mobile receiver device to perform operations such that the quality of the received ATSC-M/H signal is determined for every ATSC-M/H slot.

44. The non-transitory processor-readable storage medium of claim 41, wherein the stored processor-executable instructions are configured to cause a processor of a mobile receiver device to perform operations such that the quality of the received ATSC-M/H signal is determined periodically.

45. The non-transitory processor-readable storage medium of claim 39, wherein the stored processor-executable instructions are configured to cause a processor of a mobile receiver device to perform operations such that determining the quality of the received ATSC-M/H signal is based upon one or more of a detected error rate, a signal-to-noise ratio measurement, a channel-to-noise ratio measurement, a Doppler spread evaluation, and a signal strength measurement.

46. The non-transitory processor-readable storage medium of claim 37, wherein the stored processor-executable instructions are configured to cause a processor of a mobile receiver device to perform operations further comprising:
    determining whether an entire payload of the ATSC-M/H slot has been received and recovered; and
    entering the low power state of the receiver device when it is determined that the entire payload of the ATSC-M/H slot has been received and recovered.

47. The non-transitory processor-readable storage medium of claim 37, wherein the stored processor-executable instructions are configured to cause a processor of a mobile receiver device to perform operations further comprising:
    receiving portions of the ATSC-M/H slots containing RS parity data;
    accomplishing error correction calculations using the received RS parity data;
    determining whether more RS parity data is required to recover the data not received during the time between the start time of the ATSC M/H slot and the slot receive time and during the time between the current time and the end of the ATSC M/H slot; and
    entering the low power state of the receiver device when it is determined that no more RS parity data is required to recover payload data in the ATSC M/H slot.

48. The non-transitory processor-readable storage medium of claim 37, wherein the stored processor-executable instructions are configured to cause a processor of a mobile receiver device to perform operations further comprising:
    determining whether an end of a payload in the ATSC-M/H parade transmission has been reached;
    determining whether a received payload includes errors when the end of the payload is reached;
    turning off the receiver circuit of the receiver device to conserve power when the end of the payload is reached if it is determined that the received payload does not include errors.

* * * * *